(12) United States Patent
Saue

(10) Patent No.: US 10,278,375 B2
(45) Date of Patent: May 7, 2019

(54) UNDERWATER HARVESTING SYSTEM

(71) Applicant: Norwegian Innovation Technology Group AS, Bergen (NO)

(72) Inventor: Vidar Saue, Bønes (NO)

(73) Assignee: Norwegian Innovation Technology Group AS, Bergen (NO)

( * ) Notice: Subject to any disclaimer, the term of this patent is extended or adjusted under 35 U.S.C. 154(b) by 179 days.

(21) Appl. No.: 15/533,422

(22) PCT Filed: Dec. 15, 2015

(86) PCT No.: PCT/EP2015/079756
§ 371 (c)(1),
(2) Date: Jun. 6, 2017

(87) PCT Pub. No.: WO2016/096832
PCT Pub. Date: Jun. 23, 2016

(65) Prior Publication Data
US 2017/0360016 A1    Dec. 21, 2017

(30) Foreign Application Priority Data
Dec. 15, 2014   (EP) ..................................... 14197887

(51) Int. Cl.
*A01K 79/02* (2006.01)
*A01D 44/00* (2006.01)
*A01K 79/00* (2006.01)

(52) U.S. Cl.
CPC .............. *A01K 79/02* (2013.01); *A01D 44/00* (2013.01); *A01K 79/00* (2013.01)

(58) Field of Classification Search
CPC ......... A01K 80/00; A01K 79/02; A01K 79/00
(Continued)

(56) References Cited

U.S. PATENT DOCUMENTS 2,720,047 A * 10/1955 Isaacs .................... A01K 80/00
                                                   43/7
2,890,543 A *  6/1959 Mitchell ................ A01K 73/02
                                                   43/9.1
(Continued)

FOREIGN PATENT DOCUMENTS

CA           2134515        10/1994
CA           2319656 A1 *   8/1999   ............. A01K 79/00
(Continued)

OTHER PUBLICATIONS

Chilean Office Action issued in related Application No. 201701442 dated Oct. 22, 2018.
(Continued)

*Primary Examiner* — Christopher P Ellis
(74) *Attorney, Agent, or Firm* — Woodard, Emhardt, Henry, Reeves & Wagner, LLP

(57) ABSTRACT

The present invention relates to an underwater harvesting system (1) for harvesting zooplankton or mesoplagic fishes, comprising an underwater vehicle (2) for being lowered into the sea and towed behind a surface vessel (3), comprising a housing (21) provided with an inlet (22) through which zooplankton-containing-fluid may flow; a hose (4) mounted on the underwater vehicle and in fluid communication with the inlet, the hose being adapted to secure and fluidly connect the underwater vehicle to the surface vessel; and pumping means for drawing in a zooplankton-containing-fluid through the inlet in the underwater vehicle and for pumping the zooplankton-containing-fluid through the hose to the surface vessel. The invention further relates to a method for harvesting zooplankton or other marine organisms.

18 Claims, 2 Drawing Sheets

(58) Field of Classification Search
USPC .......................................................... 43/4.5
See application file for complete search history.

(56) References Cited

U.S. PATENT DOCUMENTS

| | | | | |
|---|---|---|---|---|
| 3,475,846 A * | 11/1969 | Springston, Jr. | ........ | A01K 80/00 43/9.1 |
| 4,558,534 A * | 12/1985 | Phillips | ........ | A01K 80/00 43/4 |
| 5,347,798 A * | 9/1994 | Quin | ........ | A01D 44/00 56/8 |
| 5,361,528 A * | 11/1994 | Peacock | ........ | A01K 73/02 43/6.5 |
| 6,056,981 A | 5/2000 | Saxby | | |
| 6,112,699 A * | 9/2000 | Saxby | ........ | A01K 80/00 119/213 |
| 6,343,433 B1 * | 2/2002 | Granberg | ........ | A01K 75/00 114/255 |
| 6,484,668 B2 * | 11/2002 | Riverin | ........ | A01K 80/00 119/201 |
| 9,936,711 B1 * | 4/2018 | Ding | ........ | A23B 4/03 |
| 10,159,230 B1 * | 12/2018 | Ding | ........ | A01K 79/00 |
| 2008/0141577 A1 * | 6/2008 | Angell | ........ | A01K 73/02 43/9.1 |
| 2013/0152864 A1 | 8/2013 | Grajcar | | |

FOREIGN PATENT DOCUMENTS

| | | |
|---|---|---|
| CN | 1146709 A | 4/1997 |
| CN | 1324564 A | 12/2001 |
| CN | 102972381 A | 3/2013 |
| CN | 203523588 U | 4/2014 |
| GB | 2494698 A | 3/2013 |
| JP | 11313572 | 11/1999 |
| WO | WO 2006/054000 A1 | 5/2006 |

OTHER PUBLICATIONS

Chinese Office Office Action and English translation Issued in related CN201580068351.9 dated Dec. 19, 2018.
English translation of Chinese Search Report Issued in related CN2015800683519 dated Dec. 11, 2018.
Machine translation of CN102972361A by Lexis Nexis Total Patent on Jan. 22, 2019 (pp. 20).
Machine translation of CN1324564A by Lexis Nexis Total Patent on Jan. 22, 2019 (pp. 11).
Machine translation of CN20352588U by Lexis Nexis Total Patent on Jan. 22, 2019 (pp. 10).
Machine translation of JPH11313572 by Patent Translate European Patent Office on Jan. 22, 2019 (pp. 22).

* cited by examiner

UNDERWATER HARVESTING SYSTEM

FIELD OF THE INVENTION

The present invention relates to an underwater harvesting system for harvesting zooplankton, comprising an underwater vehicle for being lowered into the sea and towed behind a surface vessel, comprising a housing provided with an inlet through which zooplankton-containing-fluid may flow; a hose mounted on the underwater vehicle and in fluid communication with the inlet, the hose being adapted to secure and fluidly connect the underwater vehicle to the surface vessel; and pumping means for drawing in a zooplankton-containing-fluid through the inlet in the underwater vehicle and for pumping the zooplankton-containing-fluid through the hose to the surface vessel. The invention further relates to a method for harvesting zooplankton or other marine organisms.

BACKGROUND OF THE INVENTION

Plankton are a diverse group of organisms living primarily in the oceans and includes amongst others zooplankton, such as krill. Zooplankton is a major ocean recourse with considerable human and economic potential, but catching or harvesting of zooplankton is difficult for various reasons.

So long, catching zooplankton has been done using large nets or trawl with a very small mesh-size. A problem associated with using nets having a small mesh-size is that the bycatch may be considerable and difficult to prevent. Fry or other small species may unintentionally be caught in the nets, which may have severe consequences for the marine environment.

Consequently, fishery of zooplankton and krill using traditional fishing methods is banned in most territories worldwide. Today, commercial fishery of krill primarily takes place in Antarctic regions where krill is relatively large and caught near the surface, which helps to reduce the risk of bycatch.

To ensure the future food supply for a growing population, ocean resources are an important and nutrition-wise good source. However, ocean resources are scarce and commercial fishery must be regulated to ensure future supply. A need thus exists for fishing technologies and instruments, which serve to protect the environment and reduce harmful effects, such as bycatch.

Hence, an improved technology for catching zooplankton and other marine organisms would be advantageous, and in particular, more efficient and reliable fishing instruments that reduce bycatch would be advantageous.

OBJECT OF THE INVENTION

It is an object of the present invention to wholly or partly overcome the above disadvantages and drawbacks of the prior art. More specifically, it is an object to provide fishing techniques and instruments, which can be used to selectively catch specific species in a controlled manner, compared to traditional mass-catching techniques.

SUMMARY OF THE INVENTION

Thus, the above described object and several other objects are intended to be obtained in a first aspect of the invention by providing an underwater harvesting system for harvesting zooplankton, comprising an underwater vehicle for being lowered into the sea and towed behind a surface vessel, comprising a housing provided with an inlet through which zooplankton-containing-fluid may flow; a hose mounted on the underwater vehicle and in fluid communication with the inlet, the hose being adapted to secure and fluidly connect the underwater vehicle to the surface vessel; pumping means for drawing in a zooplankton-containing-fluid through the inlet in the underwater vehicle and for pumping the zooplankton-containing-fluid through the hose to the surface vessel, wherein the underwater vehicle further comprises a laser emitting device for emitting light with a predefine wavelength onto a defined water area to facilitate schooling of zooplankton in the illuminated water area.

A surface vessel covers a range of different water-borne vehicles including ships, boats or hovercraft.

The underwater harvesting system herein described may also be suitable for being lowered into the sea for shore or from floating devices that may float onto the surface of the sea or located at a desired depth in the sea.

The features of the underwater system are thus not specifically designed for delivery the harvested living organism towards a specific container of the harvested living organism. In that respect, whether the container for the harvested living organism is on shore, floating at a specific depth in the sea, floating onto the surface of the sea or on a surface vessel, the underwater harvesting vehicle of the invention can be used without modification for pumping the living organisms containing fluid through the hose to the container.

The underwater harvesting system is also suitable for harvesting mesopelagic fish, i.e. fishes living in the mesopelagic zone and having a length between 2 and 10 cm. No changes to the features of the underwater harvesting system are necessary so as to harvest mesopelagic fishes.

Thus, in one aspect the invention relates to an underwater harvesting system for harvesting zooplankton or mesopelagic fishes, the system comprising: an underwater vehicle for being lowered into the sea, comprising a housing provided with an inlet through which zooplankton or mesopelagic fishes-containing-fluid may flow; a hose mounted on the underwater vehicle and in fluid communication with the inlet, the hose being adapted to secure and fluidly connect the underwater vehicle to a surface container for harvested zooplankton or mesopelagic fishes, and pumping means for drawing in zooplankton or mesopelagic fishes containing-fluid through the inlet in the underwater vehicle and for pumping the zooplankton or mesopelagic fishes containing-fluid through the hose to the surface vessel, wherein the underwater vehicle further comprises a laser emitting device or a light emitting diode, (LED) for emitting light with a predefine wavelength onto a defined water area to facilitate schooling of zooplankton or mesopelagic fishes in the illuminated water area.

The underwater harvesting system may by lowered into the sea for shore or from floating devices which may float onto the surface of the sea or located at a desired depth in the sea.

In some embodiments, the lowered underwater harvesting system may towed behind a surface vessel.

Hereby, a device for selectively catching specific species such as zooplankton and krill is achieved. By adjusting the wavelength of the light emitted by the laser or the LED, specific species may be attracted by the light and caught.

In that respect, through further adjustments of the wavelength of the light emitted by the laser or the LED, other specific species, such as mesopelagic fishes may be attracted and caught.

In some other embodiments, a different source of light than laser or LED may be used so as to emit light that would attract zooplankton or mesopelagic fishes.

Further, the inlet in the housing may be variable in size, for example so as to accommodate zooplankton or mesopelagic fishes with different sizes. In one embodiment, the underwater vehicle may comprise an inlet hatch covering the inlet and movable between a close position wherein the inlet is substantially closed and an open position wherein the inlet is fully opened. Additionally, the inlet hatch may be pivotally mounted underneath the housing of the underwater vehicle and movable between the close position wherein the inlet hatch is retraced and substantially flushed with a bottom side of the housing and the open position wherein the inlet hatch is extended below the housing.

By being able to vary the size of the inlet, it is possible to reduce the drag of the underwater vehicle and improve the way the underwater vehicle moves through the water. This may for example be advantageous when towing the underwater vehicle through the ocean in search of zooplankton or mesopelagic fishes. When a school of zooplankton or mesopelagic fishes is identified, the inlet is opened to increase the reach of the device and improve the catching effect.

Moreover, the laser-emitting device or another source of light, such as an LED, is adapted for emitting light with a wavelength of 400-550 nm, preferably approximately 470 nm. These wavelengths correspond to the natural wavelength emitted by some species of zooplankton, such as krill, or mesopelagic fishes.

Furthermore, the underwater vehicle may comprise one or more interchangeable buoyancy adjustment elements for controlling the buoyancy of the underwater vehicle. By having a device wherein the buoyancy is controlled using relatively simple means, the device is more robust as complex and fragile systems for controlling buoyance can be avoided.

Additionally, the underwater vehicle may comprise a camera for recording and sending images to the surface vessel. Further, the camera may incorporate a pan tilt function so that the surroundings of the underwater vehicle can be monitored to identify zooplankton or mesopelagic fishes. Also, the camera may be a silicon intensifier target camera for recoding images under low-light conditions.

The underwater vehicle may also comprise a first light emitting device for attracting zooplankton, or mesopelagic fishes, for example as shown in FIG. 3, i.e. the first light emitting device 9. The underwater vehicle may also comprise a second light emitting device, such as a high-intensity discharge lamp, for illuminating an area surrounding the underwater vehicle. Further, the underwater vehicle may comprise a sonic device, such as an echo sounder for identifying schools of zooplankton, or mesopelagic fishes.

Moreover, the underwater vehicle may comprise an on-board propulsion system for manoeuvring the underwater vehicle subsea. Hereby, the underwater vehicle may be manoeuvring independently of the surface vessel.

In some embodiments, the underwater harvesting system comprises a system for heave compensation so as to reduce the influence of waves during operation. The heave compensation system may be an active heave compensation (AHC) or a passive heave compensation (PHC) system.

Active heave compensation system may comprise electric or hydraulic winch systems. A control system, such as a programmable logic controller (PLC) calculates and controls how the active parts of the system have to react to the movement induced by the waves.

Passive heave compensation systems have the characteristics of not consuming electrical power and stores the energy from the waves and dissipates it at a later stage.

The invention further relates to a method for harvesting zooplankton or other marine organisms, such as mesopelagic fishes, using the above described underwater harvesting system, comprising the steps of deploying the underwater vehicle into the sea, activating the laser emitting device to illuminate a defined water area to facilitate schooling of zooplankton or other marine organisms, towing the underwater harvesting system through the sea and the illuminated water area, and activating the pumping means to draw in a zooplankton-containing-fluid through the inlet and to pump the zooplankton-containing-fluid through the hose. Moreover, the method may include the step of activating the inlet hatch to move the inlet hatch from the close position to the open position, when a school of zooplankton has been identified and is within predefined distance of the inlet.

Further aspects, advantages and features of the present invention will be apparent from and elucidated with reference to the dependent claims, the description and the accompanying drawings.

BRIEF DESCRIPTION OF THE FIGURES

The underwater harvesting system according to the invention will now be described in more detail with regard to the accompanying figures. The FIGS. show one way of implementing the present invention and is not to be construed as being limiting to other possible embodiments falling within the scope of the attached claim set.

DETAILED DESCRIPTION OF AN EMBODIMENT

Figure 1:
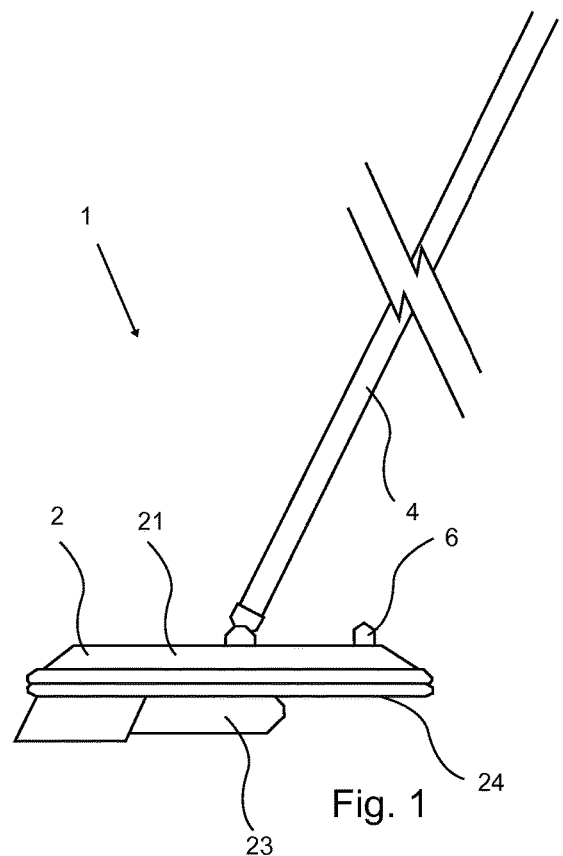
FIG. 1 shows an underwater harvesting system seen from the side.

FIG. 1 shows an underwater harvesting system 1 according to one embodiment of the invention. The harvesting device comprises comprising an underwater vehicle 2 comprising a housing 21 provided with an inlet 22 shown in FIG. 2. A hose 4 fluidly connected with the inlet extends from the housing. By providing a pumping effect in the hose, fluid containing zooplankton or mesopelagic fishes may be drawn in through the inlet in the housing and pumped through the hose 4.

Figure 3:
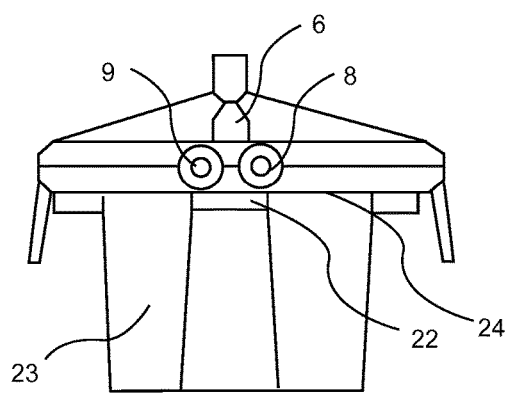
FIG. 3 shows an underwater vehicle seen from the front with the inlet hatch in an open position.

As shown in FIG. 3 the underwater vehicle 2 is adapted to be deployed subsea and towed behind a surface vessel 3. The hose extending from the underwater vehicle is used to secure and fluidly connect the underwater vehicle to the surface vessel. Hereby, fluid containing zooplankton or mesopelagic fishes may be pumped from the inlet 22 in the underwater vehicle to containers on-board the surface vessel. Pumping means may be provided in a number of ways know to the skilled person. A fluid pump may for example be connected to an end of the hose opposite the underwater vehicle 2. Hereby, when the pump is operated, fluid is drawn through the hose. Alternatively, an airlift pump may be utilized wherein compressed air is introduced into the hose closed to the inlet in the housing of the underwater vehicle. As compressed air enters the hose and expands, fluid in the hose is lifted towards the surface due to a reduction in density of the fluid caused by the expanding air. Compressed air may be supplied from a compressor located at the surface and delivered through an air hose. The air hose may be integrated with the hose for transporting fluid containing zooplankton or provided as a separate hose. Alternatively, compressed air may be supplied from tanks arranged in the housing of the underwater vehicle.

Figure 4:
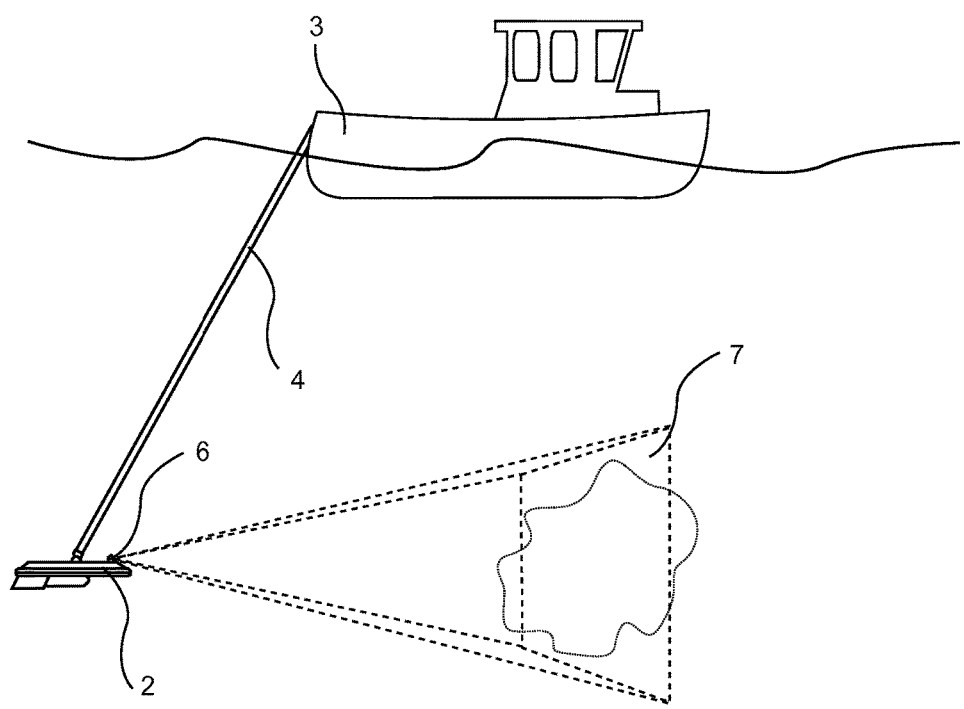
FIG. 4 shows an underwater vehicle towed behind a surface vessel.

The underwater vehicle 2 further comprises a device for emitting light such as laser emitting device 6 for emitting light with a predefine wavelength. The light is emitted onto a defined water area 7 as shown in FIG. 4, to facilitate schooling of zooplankton. Wavelength from 400-550 nm, preferable approximately 470 nm may be used to attract zooplankton, such as krill. Other wavelengths may be used to influence zooplankton in other ways. When a school of zooplankton has been created, emitted light may for example be used to prevent subsequent scattering of the zooplankton and thereby keep the school together for as long as possible. Hereby, the emitted light may be considered a virtual net keeping the zooplankton together.

In some embodiments, the device for emitting light may be an LED.

Figure 2:
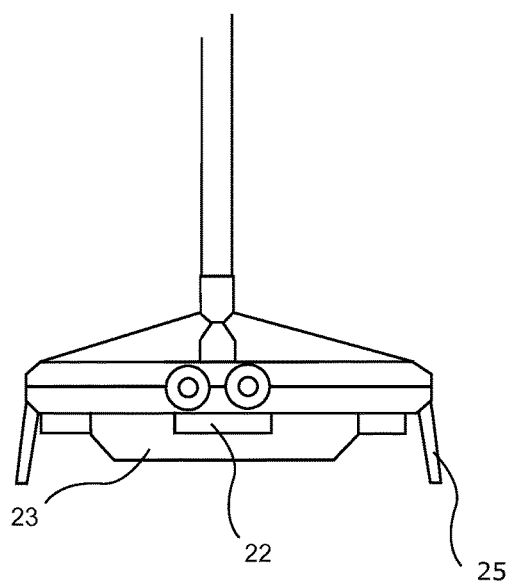
FIG. 2 shows an underwater vehicle seen from the front with the inlet hatch in a closed position.

Returning to FIG. 1-3, the housing of the underwater vehicle may be made from a polymer foam material, such as divinycell, which is a closed cell medium to high density foam having a high compression strength and durability. By making the housing from such material, the underwater vehicle becomes naturally buoyant and very durable and robust. Further, the housing is provided with an inlet hatch 23 covering the inlet 22. The inlet hatch is pivotally mounted underneath the housing of the underwater vehicle between a closed position, as shown in FIG. 2, and an open position, as shown in FIG. 3. When the inlet hatch is in the close position, the inlet is substantially closed and in the open position the inlet is fully opened. Further, in the close position the inlet hatch is retraced and substantially flushed with a bottom side 24 of the housing, and in the open position the inlet hatch is extended below the housing. Moreover, the housing is provided with a skirt 25 along its rear periphery. The skirt serves to improve the hydrodynamic properties of the underwater vehicle and may improve direction stability. The housing may also be provided with one or more fins for controlling how the underwater vehicle moves through the water.

The underwater vehicle also comprises a control system for controlling various sensors and functionalities, such as the inlet hatch. The control system receives input from an operator at the surface, for example via a wireline connection running along the hose.

To control the buoyancy of the underwater vehicle one or more interchangeable buoyancy adjustment elements are provided in the housing. The buoyancy of the underwater vehicle may for example be adjusted according to the depth and speed at which it should be towed.

An important feature of the underwater vehicle is the ability to selectively catch specific species. For this purpose, the underwater vehicle may comprise one or more cameras, for example as shown in FIG. 3, i.e. camera 8, for recording images and sending image data to the surface vessel or other location from where the underwater vehicle may be controlled. Based on information provided by the images, an operator may control the underwater vehicle, for example by activating the pumping means to draw in fluid containing zooplankton. If the operator cannot determine a species surrounding the underwater vehicle, he may choose not to activate the pumping means.

To be able to get a better overview of the surroundings of the underwater vehicle, the camera may incorporate a pan tilt function so that the camera may be rotated. Further, special cameras such as silicon intensifier target cameras or other cameras suitable for low-light conditions may be used, if the underwater vehicle is used in places with limited natural light.

As a supplement or an alternative to the laser-emitting device, the underwater vehicle may also comprise one or more light emitting devices for attracting zooplankton or mesopelagic fishes. A light emitting device may comprise RGD-LEDs for emitting light to attract zooplankton or mesopelagic fishes towards the inlet in the housing. The underwater vehicle may also be provided with a light emitting device, such as a high-intensity discharge lamp, for illuminating an area surrounding the underwater vehicle. Such light may be used to get a better understanding of the surroundings, for example to identify nearby species.

In use, the underwater vehicle is deployed into the sea for example from a surface vessel. The underwater vehicle is secured to the vessel via the hose and the hose is used to control the towing distance and, thus, the depth on which the underwater vehicle is operated. On the surface, an operator may receive various kinds of data collected by the underwater vehicle. This data may be presented on one or more monitors or other interfaces and may be used to operate the underwater vehicle. At some point, the operator activated the light emitting, such as laser emitting device to illuminate a defined water area to facilitate schooling of zooplankton or other marine organisms. Based on data collected by various sensors on-board the underwater vehicle, the operator may determine when a school of zooplankton is created. Based on this information the pumping means may be activated and the inlet opened to catch the school of zooplankton.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An underwater harvesting system for harvesting zooplankton, comprising:

An underwater vehicle for being lowered into the sea and towed behind a surface vessel, comprising a housing provided with an inlet through which zooplankton-containing-fluid may flow, a hose mounted on the underwater vehicle and in fluid communication with the inlet, the hose being adapted to secure and fluidly connect the underwater vehicle to the surface vessel, and pumping means for drawing in zooplankton-containing-fluid through the inlet in the underwater vehicle and for pumping the zooplankton-containing-fluid through the hose to the surface vessel, wherein the underwater vehicle further comprises a source of light for emitting light with a predefine wavelength onto a defined water area to facilitate schooling of zooplankton in the illuminated water area.

2. An underwater harvesting system according to claim 1, wherein the inlet is variable in size.

3. An underwater harvesting system according to claim 1, wherein the underwater vehicle comprises a inlet hatch covering the inlet and movable between a close position wherein the inlet is substantially closed and an open position wherein the inlet is fully opened.

4. An underwater harvesting system according to claim 3, wherein the inlet hatch is pivotally mounted underneath the housing of the underwater vehicle and movable between the close position wherein the inlet hatch is retraced and substantially flushed with a bottom side of the housing and the open position wherein the inlet hatch is extended below the housing.

5. An underwater harvesting system according to claim 1, wherein the source of light is adapted for emitting light with a wavelength of 400-550 nm.

6. An underwater harvesting system according to claim 1, wherein the underwater vehicle is made from a polymer foam material, such as divinycell, and adapted to be neutrally buoyant.

7. An underwater harvesting system according to claim 1, wherein the underwater vehicle comprises one or more interchangeable buoyancy adjustment elements for controlling the buoyancy of the underwater vehicle.

8. An underwater harvesting system according to claim 1, wherein the underwater vehicle comprises a camera for recording and sending images to the surface vessel.

9. An underwater harvesting system according to claim 7, wherein the camera or and additional camera is a silicon intensifier target camera for recoding images under low-light conditions.

10. An underwater harvesting system according to claim 1, wherein the underwater vehicle comprises a first light emitting device for attracting zooplankton.

11. An underwater harvesting system according to claim 1, wherein the underwater vehicle comprises a second light emitting device, such as a high-intensity discharge lamp, for illuminating an area surrounding the underwater vehicle.

12. An Underwater harvesting system according to claim 1, wherein the underwater vehicle comprises a sonic device, such as an echo sounder.

13. An underwater harvesting system according to claim 1, wherein the underwater vehicle comprises an on-board propulsion system for manoeuvring the underwater vehicle subsea.

14. A method for harvesting zooplankton or other marine organisms using an underwater harvesting system according to claim 1, comprising the steps of:
    deploying the underwater vehicle into the sea,
    activating the source of light to illuminate a defined water area to facilitate schooling of zooplankton or other marine organisms,
    towing the underwater harvesting system through the sea and the illuminated water area, and
    activating the pumping means to draw in a zooplankton-containing-fluid through the inlet and to pump the zooplankton-containing-fluid through the hose.

15. Method for harvesting zooplankton or other marine organisms according to claim 14, further comprising the step of activating the inlet hatch to move the inlet hatch from the close position to the open position, when a school of zooplankton has been identified and is within predefined distance of the inlet.

16. An underwater harvesting system according to claim 1, wherein the source of light is a device for emitting light.

17. An underwater harvesting system according to claim 1, wherein the source of light is an LED.

18. An underwater harvesting system according to claim 1, wherein the source of light is adapted for emitting light with a wavelength of approximately 470 nm.

\* \* \* \* \*